United States Patent
Wang et al.

(10) Patent No.: US 7,436,844 B2
(45) Date of Patent: Oct. 14, 2008

(54) SYSTEM AND METHOD FOR CONTROLLING PACKET TRANSMISSION IN A COMMUNICATION NETWORK

(75) Inventors: Jain-Chung Wang, Tu-Cheng (TW); Chen-Ta Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 571 days.

(21) Appl. No.: 11/069,316

(22) Filed: Mar. 1, 2005

(65) Prior Publication Data
US 2005/0169172 A1 Aug. 4, 2005

(30) Foreign Application Priority Data
Mar. 2, 2004 (TW) ............... 93105384 A

(51) Int. Cl.
*H04L 12/28* (2006.01)
(52) U.S. Cl. .................................... 370/412
(58) Field of Classification Search ......... 370/412–414, 370/416–418, 429
See application file for complete search history.

(56) References Cited
U.S. PATENT DOCUMENTS

| | | | |
|---|---|---|---|
| 6,633,540 B1 | 10/2003 | Raisanen et al. | |
| 6,862,265 B1 * | 3/2005 | Appala et al. | 370/412 |
| 2002/0191622 A1 | 12/2002 | Zdan | |
| 2002/0196796 A1 * | 12/2002 | Ambe et al. | 370/401 |
| 2003/0058837 A1 * | 3/2003 | Denney et al. | 370/412 |
| 2003/0103503 A1 | 6/2003 | Dubuc et al. | |

FOREIGN PATENT DOCUMENTS
WO WO 02-30062 A1 4/2002

* cited by examiner

*Primary Examiner*—Hassan Kizou
*Assistant Examiner*—Joshua Smith
(74) *Attorney, Agent, or Firm*—Morris Manning Martin LLP; Tim Tingkang Xia, Esq.

(57) ABSTRACT

A system for controlling packet transmission in a communication network includes: a classifier for classifying a plurality of packets into different types and for transmitting the classified packets based on a service level agreement (SLA); a meter for determining whether a data arrival rate of packets received from the classifier is more than a token rate, and if not, considering the packets as in-profile packets, or otherwise, considering the packets as out-profile packets; a marker for re-marking packets received from the classifier and out-profile packets that need to be transmitted first based on the SLA; a traffic adjuster for discarding out-profile packets that do not need to be transmitted first based on the SLA; and a classifying server for providing differentiated bandwidths for packets received from the classifier and the traffic adjuster. A related method for controlling packet transmission in a communication network is also provided.

9 Claims, 4 Drawing Sheets

US 7,436,844 B2

SYSTEM AND METHOD FOR CONTROLLING PACKET TRANSMISSION IN A COMMUNICATION NETWORK

BACKGROUND OF THE INVENTION

1. Field of the Invention

The present invention relates to systems and methods for managing electronic communication networks, and particularly relates to systems and methods for controlling packet transmission in a communication network.

2. Prior Art

The development of electronic communication networks has led to the creation of a huge variety of different kinds of transmission signals, such as audio signals and video signals. There has been a growing need to process all kinds of different data packets based on specific, guaranteed bandwidths. Therefore, a protocol known as differentiated service (DiffServ) was developed by an industry group known as the Network Working Group (NWG), to formalize an architecture for providing different services for all kinds of data packets.

One prior art that provides a differentiated service to all kinds of packets according to specific routing requirements is as follows. U.S. patent Pub. No. 2002/0191622, published on Dec. 19, 2002, discloses a system and method of differentiated queuing in a routing system. The system re-marks each packet header field with a new value, for providing a differentiated service. The invention can ensure that packets having higher priorities are provided with bandwidth guarantees first. However, the other packets that have lower priorities may be jammed in the system for a long time, or may not even be transmitted at all. Therefore, there is a need to control packet transmission in a communication network in a more balanced and flexible manner.

SUMMARY OF THE INVENTION

Accordingly, an objective of the present invention is to provide a system for controlling packet transmission in a communication network, wherein the system can provide all kinds of different packets with specific bandwidth guarantees.

Another objective of the present invention is to provide a method for controlling packet transmission in a communication network, wherein the method can provide all kinds of different packets with specific bandwidth guarantees.

In order to accomplish the above-mentioned first objective, a system for controlling packet transmission in a communication network comprises: a classifier for classifying a plurality of packets into different types based on contents of header fields of the packets, and for transmitting the classified packets based on a service level agreement (SLA); a meter coupled to the classifier for determining whether a data arrival rate of packets received from the classifier is more than a token rate defined by a token bucket (TB) profile, and if not, considering the packets as in-profile packets, or otherwise, considering the packets as out-profile packets; a marker coupled to the classifier and the meter for re-marking packets received from the classifier and out-profile packets that need to be transmitted first based on the SLA, with differentiated service code point (DSCP) values, 802.p priority tag (802.1p) values, or both such values; a traffic adjuster coupled to the meter and the marker for transmitting in-profile packets and packets received from the marker, and for discarding out-profile packets that do not need to be transmitted first based on the SLA; and a classifying server coupled to the traffic adjuster and the classifier for providing differentiated bandwidths for packets received from the classifier and the traffic adjuster.

In order to accomplish the above-mentioned second objective, a method for controlling packet transmission in a communication network comprises: (a) classifying a plurality of packets into different types based on contents of header fields of the packets; (b) determining whether any of the classified packets are to be transmitted to a classifying server, based on a service level agreement (SLA); (c) determining whether any of the classified packets are to be transmitted to a marker based on the SLA, in respect of any classified packets that are not transmitted to the classifying server; (d) determining whether a data arrival rate of the classified packets is more than a token rate, in respect of any classified packets that are not transmitted to the marker; (e) determining whether any of out-profile packets need to be transmitted first based on the SLA, if the data arrival rate of the classified packets is more than the token rate; (f) re-marking the classified packets that are transmitted to the marker and the out-profile packets that need to be transmitted first, with a Differentiated Service Code Point (DSCP) value, an 802.1 p priority tag (802.1 p) value, or both such values; (g) transmitting packets whose data arrival rate is not more than the token rate and the re-marked packets to the classifying server, and discarding out-profile packets that do not need to be transmitted first based on the SLA; and (h) providing differentiated bandwidths for the packets whose data arrival rate is not more than the token rate, the re-marked packets, and the classified packets that are transmitted to the classifying server according to step (b) above.

These and other objectives of the present invention will become apparent to those of ordinary skill in the art after reading the following detailed description of a preferred embodiment and method that are illustrated in the various figures and drawings.

DETAILED DESCRIPTION OF THE INVENTION

Figure 1:
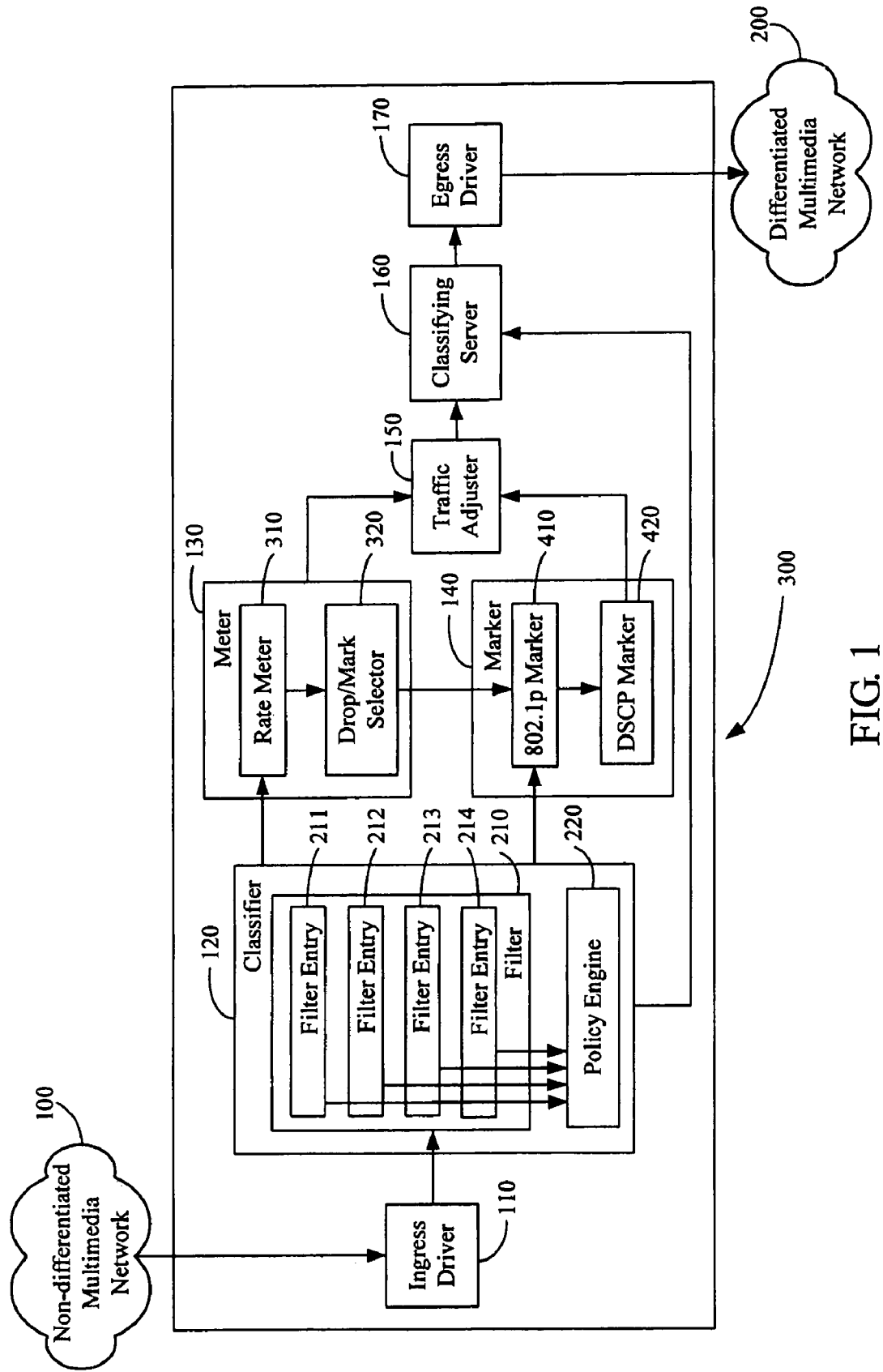
FIG. 1 is a block diagram of a system for controlling packet transmission in a communication network in accordance with the preferred embodiment of the present invention.

FIG. 1 is a block diagram showing a system 300 for controlling packet transmission between a non-differentiated multimedia network 100 and a differentiated multimedia network 200. The system 300 comprises an ingress driver 110, a classifier 120, a meter 130, a marker 140, a traffic adjuster 150, a classifying server 160, and an egress driver 170.

In the system 300, the ingress driver 110 receives a plurality of packets transmitted from the non-differentiated multimedia network 100, and then transmits the plurality of packets to the classifier 120. The classifier 120 comprises a filter 210 and a policy engine 220. The filter 210 comprises a plurality of filter entries 211, 212, 213, 214. The policy engine 220 is coupled to the plurality of filter entries 211, 212, 213,

214. The packets transmitted from the ingress driver 110 are transmitted to the filter entries 211, 212, 213, 214 firstly, where they are classified into different types based on contents of header fields of the packets. The policy engine 220 determines a service level agreement (SLA) that is a service contract between a user and a communication network service provider. The classifier 120, the marker 140, the traffic adjuster 150 and the classifying server 160 deal with all the packets based on the SLA. When the packets are transmitted to the policy engine 220, the policy engine 220 transmits the packets to the meter 130, the marker 140 or the classifying server 160 according to the SLA. For instance, if the SLA determines that packets transmitted from the filter entry 211 must be transmitted to the meter 130, the packets are transmitted to the meter 130; if the SLA determines that packets transmitted from the filter entry 212 must be transmitted to the marker 140, the packets are transmitted to the marker 140; and if the SLA determines that packets transmitted from the filter entry 213 must be transmitted to the classifying server 160, the packets are forwarded directly to the classifying server 160.

The meter 130 comprises a rate meter 310 and a drop/mark selector 320. After classified packets are transmitted to the meter 130 by the classifier 120, the rate meter 310 compares a data arrival rate of the packets transmitted from the classifier 120 with a token rate defined by a token bucket (TB) profile. The TB profile is used for measuring the data arrival rate of the packets. If the data arrival rate of the packets is not more than the token rate, the packet is considered as in-profile. Otherwise, the packet is considered as out-profile. The rate meter 310 transmits the in-profile packets to the traffic adjuster 150, and transmits the out-profile packets to the drop/mark selector 320. The drop/mark selector 320 transmits a group of priority out-profile packets to the marker 140, for said priority out-profile packets to be re-marked with new priority values. Whether an out-profile packet is a priority out-profile packet is determined by the SLA. The drop/mark selector 320 transmits a group of remaining out-profile packets to the traffic adjuster 150 for the remaining out-profile packets to be discarded.

The marker 140 comprises an 802.1p priority tag (802.1p) marker 410 for re-marking a 802.1p value in a header field of a packet, and a Differentiated Service Code Point (DSCP) marker 420 for re-marking a DSCP value in a header field of a packet, in both instances based on the SLA. When the classified packets transmitted from the classifier 120 and the priority out-profile packets transmitted from the meter 130 are transmitted to the 802.1p marker 410, the 802.1p marker 410 determines whether any of the classified packets and the priority out-profile packets need to be re-marked with the 802.1p values based on the SLA. If so, the relevant classified packets and the priority out-profile packets are re-marked with the 802.1p values; otherwise, the classified packets and the priority out-profile packets are not re-marked. After that, the DSCP marker 420 receives the classified packets and the priority out-profile packets, and determines whether any of the classified packets and the priority out-profile packets need to be re-marked with the DSCP values based on the SLA. If so, the relevant classified packets and the priority out-profile packets are re-marked with the DSCP values; otherwise, the classified packets and the priority out-profile packets are not re-marked. Overall, each packet is re-marked with at least one of the 802.1p value and the DSCP value. The 802.1p value is used for determining which priority queue of the classifying server 160 transmits the packets. The DSCP value is also used for determining which priority queue of the classifying server 160 transmits the packets. In addition, when the packets are re-marked with the DSCP values, the next destination addresses of the packets are changed, and the packets are transmitted according to the re-marked DSCP values in the differentiated multimedia network 200. When a packet is re-marked with both the DSCP value and the 802.1p value, the classifying server 160 transmits the packet to a corresponding queue according to the 802.1p value, and transmits the packet to a corresponding next destination address according to the DSCP value. Subsequently, all the re-marked packets are transmitted to the traffic adjuster 150. The traffic adjuster 150 is used for transmitting the in-profile packets and the re-marked packets to the classifying server 160, and discarding the remaining out-profile packets transmitted from the drop/mark selector 320.

The classifying server 160 is used for distributing bandwidths to the packets transmitted from the classifier 120 and the traffic adjuster 150, and transmitting all the packets to the egress driver 170. The egress driver 170 is used for transmitting all the packets to the differentiated multimedia network 200.

Figure 2:
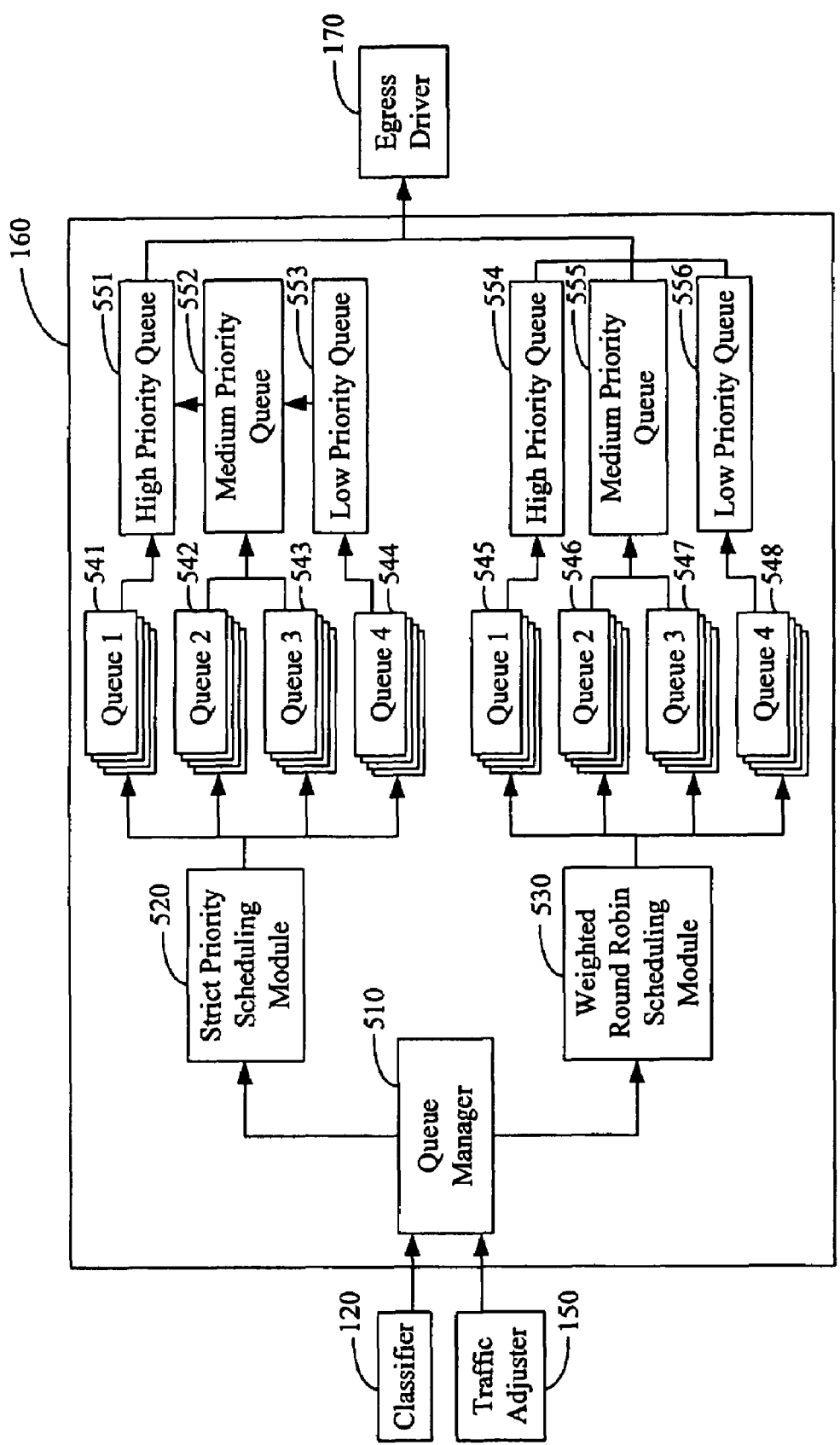
FIG. 2 is a detailed block diagram of a classifying server of the system of FIG. 1 and the immediate environment of the classifying server in the system.

FIG. 2 is a detailed block diagram of the classifying server 160 and its immediate environment. The classifying server 160 comprises a queue manager 510, a strict priority scheduling module 520, and a weighted round robin scheduling module 530. The strict priority scheduling module 520 comprises four queues 541, 542, 543, 544. The queue 541 corresponds to a high priority queue 551, the queue 542 and the queue 543 correspond to a common medium priority queue 552, and the queue 554 corresponds to a low priority queue 553. The weighted round robin scheduling module 530 comprises four queues 545, 546, 547, 548. The queue 545 corresponds to a high priority queue 554, the queue 546 and the queue 547 correspond to a common medium priority queue 555, and the queue 548 corresponds to a low priority queue 556.

The packets transmitted from the classifier 120 and the traffic adjuster 150 are transmitted to the queue manager 510 in the classifying server 160. In the queue manager 510, the user can selectively set either of two kinds of queue scheduling mechanisms, which correspond to the strict priority scheduling module 520 and the weighted round robin scheduling module 530 respectively. The strict priority scheduling module 530 schedules queues based on a strict priority scheduling mechanism. The weighted round robin scheduling module 530 schedules queues based on a weighted round robin scheduling mechanism. When the strict priority scheduling module 520 is selected, the packets transmitted directly from the classifier 120 and the in-profile packets metered by the meter 130 are transmitted to corresponding queues 541, 542, 543, 544 according to the SLA, the packets re-marked with the 802.1p values are transmitted to corresponding queues 541, 542, 543, 544 according to the 802.1p values, the packets re-marked with the DSCP values are transmitted to corresponding queues 541, 542, 543, 544 according to the DSCP values, and the packets re-marked with both the 802.1p values and the DSCP values are transmitted to corresponding queues 541, 542, 543, 544 according to the 802.1p values. Subsequently, the packets in the queue 541 are transmitted to the high priority queue 551, the packets in the queue 542 and the queue 543 are transmitted to the medium priority queue 552, and the packets in the queue 544 are transmitted to the low priority queue 553. After that, firstly, the packets in the high priority queue 551 are transmitted to the egress driver 170 until the high priority queue 551 is empty. Secondly, the packets in the medium priority queue 552 are transmitted to the egress driver 170 until the medium priority queue 552 is empty. Thirdly, the packets in the low priority queue 553 are transmitted to the egress driver 170. In this way, unsent packets that have the highest priority are transmitted first.

When the weighted round robin scheduling module 530 is selected, the packets are transmitted to corresponding of the four queues 545, 546, 547, 548. The packets transmitted directly from the classifier 120 and the in-profile packets metered by the meter 130 are transmitted to corresponding queues 545, 546, 547, 548 according to the SLA; the packets re-marked with the 802.1p values are transmitted to corresponding queues 545, 546, 547, 548 according to the 802.1p values; the packets re-marked with the DSCP values are transmitted to corresponding queues 545, 546, 547, 548 according to the DSCP values; and the packets re-marked with both the 802.1p values and the DSCP values are transmitted to corresponding queues 545, 546, 547, 548 according to the 802.1p values. Subsequently, the packets in the queue 545 are transmitted to the high priority queue 554, the packets in the queue 546 and the queue 547 are transmitted to the medium priority queue 555, and the packets in the queue 548 are transmitted to the low priority queue 556. A theory of the weighted round robin scheduling module 530 is that the high priority queue 554, the medium priority queue 555 and the low priority queue 556 are assigned different weights respectively. The higher the priority of the queue, the larger the assigned weight of the queue. Regardless of the weights assigned to the queues, the packets in the priority queues 554, 555, 556 are transmitted at the same time. In one example, the high priority queue 554 is assigned the weight w1=10, the medium priority queue 555 is assigned the weight w2=5, and the low priority queue 556 is assigned the weight w3=4. Based on the formula: transmission rate=total rate* weight for the priority queue/total weight, for a Fast Ethernet port running at 100 Mbps, the bandwidth assigned to the high priority queue 554 is 52.6 Mbps, the bandwidth assigned to the medium priority queue 555 is 26.4 Mbps, and the bandwidth assigned to the low priority queue 556 is 21 Mbps. In this way, the packets that have different priorities are transmitted at the same time but over differing bandwidths.

Figure 3:
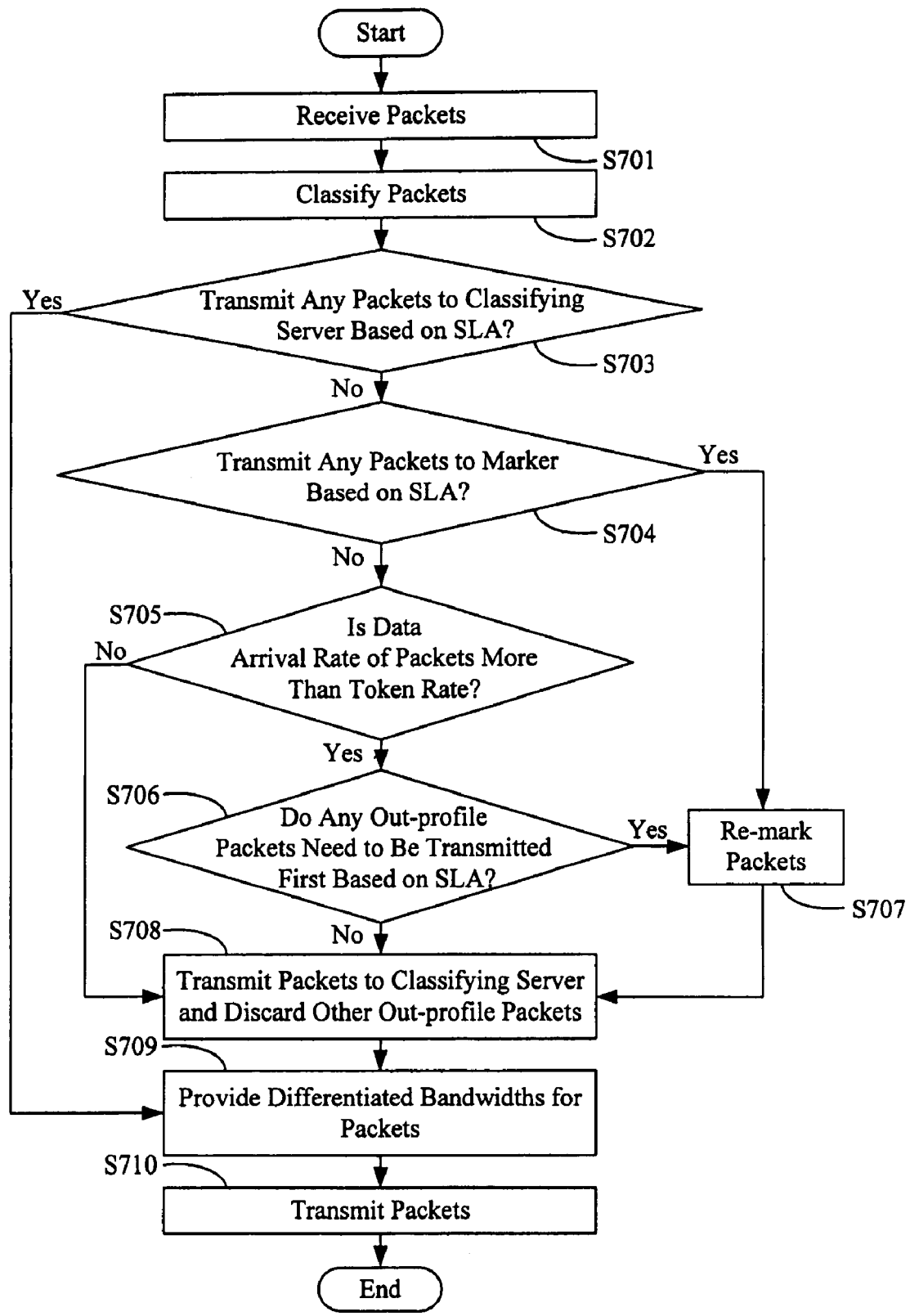
FIG. 3 is a flow chart of the preferred method for controlling packet transmission in a communication network in accordance with the present invention.

FIG. 3 is a flow chart of the preferred method for controlling packet transmission in a communication network. At step S701, the ingress driver 110 receives a plurality of packets transmitted from the non-differentiated multimedia network 100, and transmits the packets to the classifier 120. At step S702, the packets are classified into different types by the classifier 120, according to the contents of the header fields of the packets. At step S703, the policy engine 220 determines whether any of the packets transmitted from each of the filter entries 211, 212, 213, 214 are to be transmitted to the classifying server 160 based on the SLA. If so, the procedure goes directly to step S709 described below in respect of such packets. Otherwise, at step S704, the policy engine 220 determines whether any of the packets transmitted from each of the filter entries 211, 212, 213, 214 are to be transmitted to the marker 140 based on the SLA. If so, the procedure goes directly to step S707 described below in respect of such packets. Otherwise, the packets are transmitted to the meter 130. Then at step S705, the rate meter 310 determines whether the data arrival rate of the packets transmitted from the classifier 120 is more than the token rate. If not, the in-profile packets are transmitted to the traffic adjuster 150, and the procedure goes directly to step S708 described below. If so, the out-profile packets are transmitted to the drop/mark selector 320. Then at step S706, the drop/mark selector 320 determines whether any of the out-profile packets need to be transmitted first according to the SLA. If so, the procedure goes to step S707 described below in respect of such packets. Otherwise, the procedure goes directly to step S708 described below.

At step S707, the marker 140 re-marks the header fields of each of the classified packets that are received from the classifier 120 and said priority out-profile packets that are received from the meter 130 with an 802.1p value, a DSCP value, or both of these values. Thereupon, the procedure goes to step S708.

At step S708, the traffic adjuster 150 transmits the in-profile packets and the re-marked packets to the classifying server 160, and discards out-profile packets that do need to be transmitted first according to the SLA.

Then at step S709, the classifying server 160 provides differentiated bandwidths for the packets received from the classifier 120 and the traffic adjuster 150 (this is described in detail below in relation to FIG. 4). Finally, at step S710, the egress driver 170 transmits all the packets to the differentiated multimedia network 200.

Figure 4:
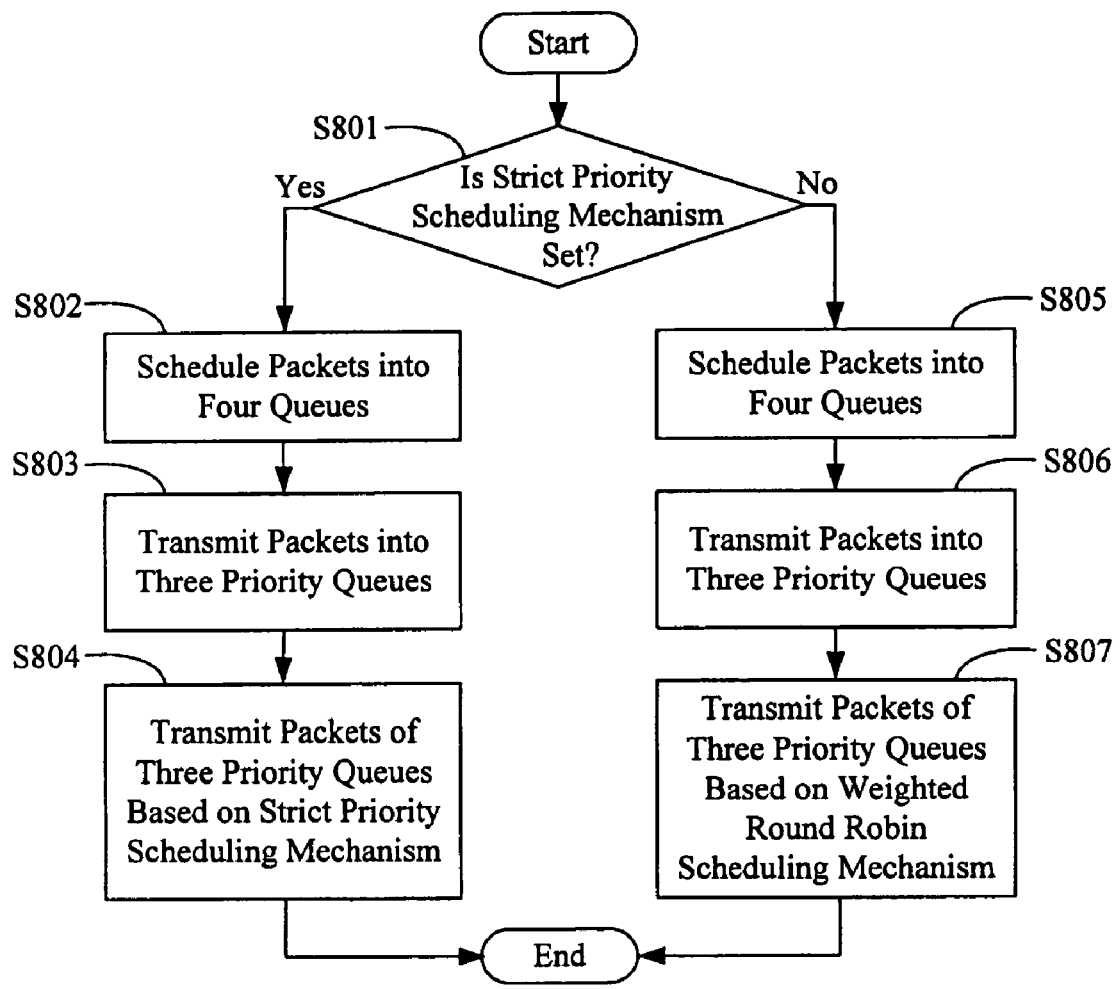
FIG. 4 is a flow chart of details of one step of FIG. 3, namely providing differentiated bandwidths for all kinds of packets.

FIG. 4 is a flow chart of details of step S709 of FIG. 3, namely providing differentiated bandwidths for the packets received from the classifier 120 and the traffic adjuster 150. When the packets are transmitted to the classifying server 160, at step S801, the queue manager 520 determines whether the strict priority scheduling module is set by the user. If not, the procedure goes to step S805 described below. If so, at step S802, the packets are transmitted into corresponding queues 541, 542, 543, 544. At step S803, the packets in the queue 541 are transmitted to the high priority queue 551, the packets in the queue 542 and the queue 543 are transmitted to the medium priority queue 552, and the packets in the queue 544 are transmitted to the low priority queue 553. Finally, at step S804, the packets in the priority queues 551, 552, 553 are transmitted to the egress driver 170 based on the strict priority scheduling mechanism.

At step S805, the packets are transmitted into corresponding queues 545, 546, 547, 548. At step S806, the packets in the queue 545 are transmitted to the high priority queue 554, the packets in the queue 546 and the queue 547 are transmitted to the medium priority queue 555, and the packets in the queue 548 are transmitted to the low priority queue 556. Finally, at step S807, the packets in the priority queues 554, 555, 556 are transmitted to the egress driver 170 based on the weighted round robin scheduling mechanism.

While a preferred embodiment and method of the present invention have been described above, it should be understood that they have been presented by way of example only and not by way of limitation. Thus the breadth and scope of the present invention should not be limited by the above-described exemplary embodiment and method, but should be defined only in accordance with the following claims and their equivalents.

What is claimed is:

1. A system for controlling packet transmission in a communication network, the system comprising:

a classifier for classifying a plurality of packets into different types based on contents of header fields of the packets, and for transmitting the classified packets based on a service level agreement (SLA);

a meter coupled to the classifier for determining whether a data arrival rate of packets received from the classifier is more than a token rate defined by a token bucket (TB) profile, and if not, considering the packets as in-profile packets, or otherwise, considering the packets as out-profile packets;

a marker coupled to the classifier and the meter for re-marking packets received from the classifier and out-profile packets that need to be transmitted first based on the SLA, with differentiated service code point (DSCP) values, 802.p priority tag (802.1p) values, or both such values;

a traffic adjuster coupled to the meter and the marker for transmitting in-profile packets and packets received from the marker, and for discarding out-profile packets that do not need to be transmitted first based on the SLA; and a classifying server coupled to the traffic adjuster and the classifier for providing differentiated bandwidths for packets received from the classifier and the traffic adjuster, the classifying server comprising:

a strict priority scheduling module, for scheduling a plurality of queues based on a strict priority scheduling mechanism, wherein the plurality of queues are divided into a high priority queue, a medium priority queue, and a low priority queue, packets in the high priority queue are transmitted thereout first, packets in the medium priority queue are transmitted thereout once the high priority queue is emptied, and packets in the low priority queue are transmitted thereout once the medium priority queue is emptied;

a weighted round robin scheduling module, for scheduling a plurality of queues based on a weighted round robin scheduling mechanism, wherein the plurality of queues are divided into a high priority queue, a medium priority queue, and a low priority queue, each queue is allocated a unique bandwidth, and the packets in the priority queues are transmitted thereout at the same time; and a queue manager for selectively setting either the strict priority scheduling mechanism or the weighted round robin scheduling mechanism via the strict priority scheduling module or the weighted round robin scheduling module.

2. The system for controlling packet transmission in a communication network as recited in claim 1, wherein the classifier comprises a plurality of filter entries for classifying the plurality of packets.

3. The system for controlling packet transmission in a communication network as recited in claim 1, wherein the classifier comprises a policy engine for transmitting the classified packets to the meter, the marker, or the classifying server based on the SLA.

4. The system for controlling packet transmission in a communication network as recited in claim 1, wherein the meter comprises a rate meter for determining whether the data arrival rate of packets received from the classifier is more than the token rate defined by the TB profile.

5. The system for controlling packet transmission in a communication network as recited in claim 1, wherein the meter comprises a drop/mark selector for transmitting the out-profile packets that need to be transmitted first to the marker, and transmitting the out-profile packets that do not need to be transmitted first to the traffic adjuster.

6. The system for controlling packet transmission in a communication network as recited in claim 1, wherein the marker comprises an 802.1p marker for determining whether any of the packets received from the classifier and the out-profile packets that need to be transmitted first are to be re-marked with 802.1p values based on the SLA, and for re-marking one or more 802.p values as needed.

7. The system for controlling packet transmission in a communication network as recited in claim 6, wherein the marker further comprises a DSCP marker for determining whether any of packets received from the 802.1p marker are to be re-marked with DSCP values based on the SLA, and for re-marking one or more DSCP values as needed.

8. A method for controlling packet transmission in a communication network, the method comprising the steps of:

(a) classifying a plurality of packets into different types based on contents of header fields of the packets;

(b) determining whether any of the classified packets are to be transmitted to a classifying server, based on a service level agreement (SLA);

(c) determining whether any of the classified packets are to be transmitted to a marker based on the SLA, in respect of any classified packets that are not transmitted to the classifying server;

(d) determining whether a data arrival rate of the classified packets is more than a token rate, in respect of any classified packets that are not transmitted to the marker;

(e) determining whether any of out-profile packets need to be transmitted first based on the SLA, if the data arrival rate of the classified packets is more than the token rate;

(f) re-marking the classified packets that are transmitted to the marker and the out-profile packets that need to be transmitted first, with a Differentiated Service Code Point (DSCP) value, an 802.1p priority tag (802.1p) value, or both such values;

(g) transmitting packets whose data arrival rate is not more than the token rate and the re-marked packets to the classifying server, and discarding out-profile packets that do not need to be transmitted first based on the SLA; and (h) providing differentiated bandwidths for the packets whose data arrival rate is not more than the token rate, the re-marked packets, and the classified packets that are transmitted to the classifying server according to step (b) above, step (h) comprising the steps of:

(h1) determining whether a strict priority scheduling mechanism is set; and if so (h2) scheduling the packets whose data arrival rate is not more than the token rate, the re-marked packets, and the classified packets that are transmitted to the classifying server according to step (b) above into plural first queues;

(h3) transmitting the packets in the plural first queues into three priority queues corresponding to the first queues, the three priority queues comprising a high priority queue, a medium priority queue, and a low priority queue;

(h4) transmitting the packets of the three priority queues corresponding to the first queues based on the strict priority scheduling mechanism, wherein packets in the high priority queue are transmitted thereout first, packets in the medium priority queue are transmitted thereout once the high priority queue is emptied, and packets in the low priority queue are transmitted thereout once the medium priority queue is emptied; and (h5) scheduling the packets whose data arrival rate is not more than the token rate, the re-marked packets, and the classified packets that are transmitted to the classifying server according to step (b) above into plural second queues, if the strict priority scheduling mechanism is not set;

(h6) transmitting the packets in the plural second queues into three priority queues corresponding to the second queues; and (h7) transmitting the packets of the three priority queues corresponding to the second queues based on a weighted round robin mechanism, wherein each queue is allocated a unique bandwidth, and the packets in the priority queues are transmitted thereout at the same time.

9. The method for controlling packet transmission in a communication network as recited in claim 8, wherein step (f) comprises the steps of:
(f1) determining whether the classified packets that are transmitted to the marker and the out-profile packets that need to be transmitted first are to be re-marked with an 802.1p value; and if so (f2) re-marking an 802.1p value accordingly; or otherwise
(f3) determining whether the classified packets that are transmitted to the marker and the out-profile packets that need to be transmitted first are to be re-marked with a DSCP value; and if so
(f4) re-marking a DSCP value accordingly.

\* \* \* \* \*